US011877374B2

(12) United States Patent
Stura et al.

(10) Patent No.: US 11,877,374 B2
(45) **Date of Patent: *Jan. 16, 2024**

(54) AEROSOL-GENERATING DEVICE WITH MODULAR INDUCTION HEATER

(71) Applicant: Philip Morris Products S.A., Neuchatel (CH)

(72) Inventors: Enrico Stura, Palezieux-Village (CH); Oleg Mironov, Cudrefin (CH); Oleg Fursa, Gempenach (CH); Tony Reevell, London (GB)

(73) Assignee: Philip Morris Products S.A., Neuchatel (CH)

(*) Notice: Subject to any disclaimer, the term of this patent is extended or adjusted under 35 U.S.C. 154(b) by 0 days.

This patent is subject to a terminal disclaimer.

(21) Appl. No.: 17/589,146

(22) Filed: Jan. 31, 2022

(65) Prior Publication Data

US 2022/0159793 A1 May 19, 2022

Related U.S. Application Data

(62) Division of application No. 16/637,058, filed as application No. PCT/EP2018/071264 on Aug. 6, 2018, now Pat. No. 11,277,886.

(30) Foreign Application Priority Data

Aug. 9, 2017 (EP) .................................... 17185563

(51) Int. Cl.
*A24F 13/00* (2006.01)
*H05B 6/10* (2006.01)
(Continued)

(52) U.S. Cl.
CPC ........... *H05B 6/108* (2013.01); *A24F 40/465* (2020.01); *A24F 40/57* (2020.01); *A24F 40/20* (2020.01)

(58) Field of Classification Search
CPC ....................................................... A24F 47/00
(Continued)

(56) References Cited

U.S. PATENT DOCUMENTS 10,021,916 B2 7/2018 Memari et al.
10,791,760 B2 10/2020 Zuber
(Continued)

FOREIGN PATENT DOCUMENTS

CN 203748673 U 8/2014
CN 204519364 U 8/2015
(Continued)

OTHER PUBLICATIONS

U.S. Appl. No. 16/637,058, filed Feb. 6, 2020, 2020/0237000 A1, Enrico Stura, et al.
(Continued)

*Primary Examiner* — Phuong K Dinh
(74) *Attorney, Agent, or Firm* — Oblon, McClelland, Maier & Neustadt, L.L.P.

(57) ABSTRACT

An aerosol-generating device is provided, including: an induction heater configured to heat an aerosol-forming substrate, the induction heater including an induction coil and a heating element, the heating element being arrangeable within the induction coil, and the induction coil having a varying pitch. An aerosol generating system is also provided, including the aerosol generating device and an aerosol generating article including an aerosol-forming substrate.

28 Claims, 8 Drawing Sheets

(51) Int. Cl.
*A24F 40/465* (2020.01)
*A24F 40/57* (2020.01)
*A24F 40/20* (2020.01)

(58) Field of Classification Search
USPC .................................................. 131/328–329
See application file for complete search history.

(56) References Cited

U.S. PATENT DOCUMENTS

| | | | | |
|---|---|---|---|---|
| 10,791,765 | B2 * | 10/2020 | Li | A24F 40/57 |
| 2008/0136066 | A1 | 6/2008 | Taylor et al. | |
| 2014/0366898 | A1 * | 12/2014 | Monsees | A24F 40/30 131/329 |
| 2016/0021934 | A1 | 1/2016 | Cadieux et al. | |
| 2016/0120225 | A1 | 5/2016 | Mishra et al. | |
| 2017/0055583 | A1 * | 3/2017 | Blandino | A24D 1/20 |
| 2017/0055584 | A1 | 3/2017 | Blandino et al. | |
| 2017/0105452 | A1 | 4/2017 | Mironov et al. | |
| 2017/0188636 | A1 | 7/2017 | Li et al. | |
| 2018/0192700 | A1 | 7/2018 | Fraser et al. | |
| 2018/0213847 | A1 | 8/2018 | Reevell | |
| 2018/0279677 | A1 | 10/2018 | Blandino et al. | |
| 2018/0279681 | A1 | 10/2018 | Rojo-Calderon et al. | |
| 2018/0289071 | A1 | 10/2018 | Cadieux et al. | |

FOREIGN PATENT DOCUMENTS

| | | | |
|---|---|---|---|
| CN | 205624467 | U | 10/2016 |
| EA | 025718 | B1 | 1/2017 |
| EP | 3 179 830 | A2 | 6/2017 |
| JP | 2005-34021 | A | 2/2005 |
| JP | 2017-506915 | A | 3/2017 |
| JP | 2017-515490 | A | 6/2017 |
| KR | 10-2007-0108215 | A | 11/2007 |
| RU | 2 611 487 | C2 | 2/2017 |
| RU | 2 653 467 | C2 | 5/2018 |
| RU | 2 655 184 | C2 | 5/2018 |
| WO | 2016/207407 | A1 | 12/2016 |
| WO | 2017/001819 | A1 | 1/2017 |
| WO | 2017/036957 | A1 | 3/2017 |
| WO | WO 2017/036950 | A2 | 3/2017 |
| WO | 2017/068099 | A1 | 4/2017 |
| WO | 2017/167610 | A1 | 10/2017 |

OTHER PUBLICATIONS

Office Action dated May 19, 2022, in corresponding Korean Patent Application No. 10-2022-7006278 (with English Translation), 15 pages.

International Search Report and Written Opinion dated Nov. 13, 2018 in PCT/EP2018/071264 filed on Aug. 6, 2018.

Decision to Grant dated Jul. 14, 2020 in Russian Patent Application No. 2020105873/28(008984) (submitting English language translation only), 6 pages.

Combined Chinese Office Action and Search Report dated Jan. 6, 2022 in Chinese Patent Application No. 201880050937.6 (submitting English translation only), 7 pages.

Extended European Search Report dated Jul. 11, 2023 in European Patent Application No. 23162934.6, 13 pages.

* cited by examiner

AEROSOL-GENERATING DEVICE WITH MODULAR INDUCTION HEATER

CROSS-REFERENCE TO RELATED APPLICATIONS

This application is a divisional application of and claims benefit under 35 U.S.C. § 120 to U.S. application Ser. No. 16/637,058, filed on Feb. 6, 2020, which is a U.S. national stage application of PCT/EP2018/071264, filed on Aug. 6, 2018, and claims benefit of priority under 35 U.S.C. § 119 to EP 17185563.8, filed on Aug. 9, 2017, the entire contents of each of which are incorporated herein by reference.

TECHNICAL FIELD

The present invention relates to an aerosol-generating device comprising an induction heater for heating an aerosol-forming substrate. The induction heater comprises an induction coil and a heating element, wherein the heating element is arrangeable within the induction coil, such that it can be heated inductively.

DESCRIPTION OF THE RELATED ART

It is known to employ different types of heaters in aerosol-generating articles for generating an aerosol. Typically, resistance heaters are employed for heating an aerosol-forming substrate such as an e-liquid. It is also known to provide "heat not burn" devices utilizing resistance heaters, which generate an inhalable aerosol by heating but not burning an aerosol-forming substrate containing tobacco.

Induction heaters offer advantages and have been proposed in the above devices. Induction heaters are for example described in US 2017/055580 A1. In induction heaters, an induction coil is arranged around a component made from a conductive material. The component may be denoted as a heating element or susceptor. A high-frequency AC current is passed through the induction coil. As a result, an alternating magnetic field is created within the induction coil. The alternating magnetic field penetrates the heating element thereby creating eddy currents within the heating element. These currents lead to a heating of the heating element. In addition to heat generated by eddy currents, the alternating magnetic field may also cause the susceptor to heat due to the hysteresis mechanism. Some susceptors may even be of a nature that no, or almost no, eddy currents will take place. In such susceptors substantially all the heat generation is due to hysteresis mechanisms. Most common susceptors are of such a kind, where heat is generated by both mechanisms. A more elaborate description of the processes and responsible for generating heat in a susceptor, when penetrated by an alternating magnetic field may be found in WO2015/177255. Inductive heaters facilitate rapid heating which is beneficial for generating an aerosol during the operation of the aerosol-generating device.

It would be desirable to have an aerosol-generating device with an induction heater in which the heating element can be easily accessed for cleaning and replacing the heating element.

SUMMARY

According to a first aspect of the invention there is provided an aerosol-generating device comprising an induction heater for heating an aerosol-forming substrate. The induction heater comprises an induction coil and a heating element, wherein the heating element is arrangeable within the induction coil. The aerosol-generating device further comprises a housing with a first housing portion and a second housing portion. The first housing portion comprises a power supply for supplying power to the induction coil of the induction heater and a controller for controlling the supply of power from the power supply to the induction coil of the induction heater. In the second housing portion, the induction coil of the induction heater is arranged, and the second housing portion is configured for receiving a consumable containing aerosol-forming substrate. The first and second housing portions are configured to be arranged in a first position in which the induction heater is configured to be operated and a second position, such that the heating can be accessed. In the second position one or both of the first and second housing portions are displaced.

BRIEF DESCRIPTION OF THE DRAWINGS

The invention will be further described, by way of example only, with reference to the accompanying drawings in which.

DETAILED DESCRIPTION

Figure 1:
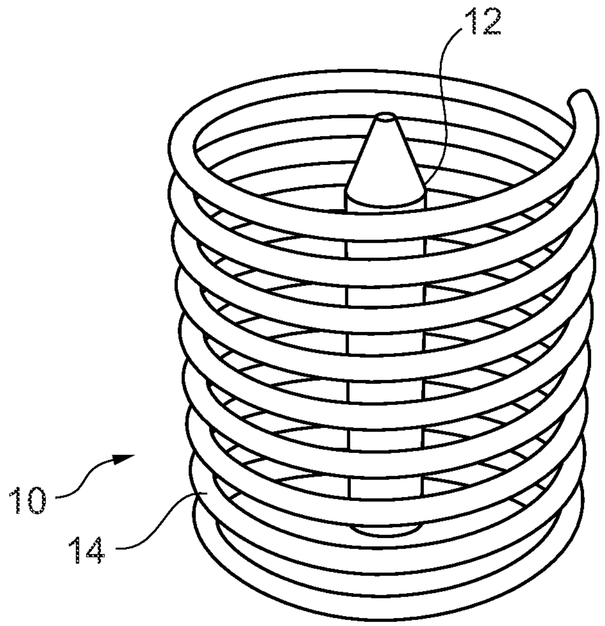
FIG. 1 shows a conventional induction heater.

Changing the position of the housing portions with respect to each other from the first position in which the aerosol-generating device may be operated normally to the second position enables the heating element to be cleaned or replaced. The second position may enable an easy access to the heating element. Aerosol-forming substrate containing tobacco may be provided in the form of an aerosol-generating article. The aerosol-generating article may be provided as a consumable such as a tobacco stick. In the following, the aerosol-generating article will be denoted as a consumable. These consumables may have an elongate rod-like shape. Such a consumable is typically pushed into a recess of the device. In the recess, the heating element of the induction heater is provided such that the consumable is pushed over the heating element. In this way the heating element may penetrate the consumable. Once the aerosol-forming substrate in the consumable is depleted after multiple heating cycles of the induction heater, the consumable is removed and replaced by a new consumable. Upon removing the depleted consumable, residues of depleted aerosol-forming substrate may stick to the heating element and impair the functionality of the heating element. Such residues may affect subsequent aerosol generation and are thus unwanted. In the second position, the heating element may be accessible such that residues may be easily removed.

The heating element may be configured to be replaced when the first and second housing portions are in the second position. If the heating element is deteriorated, it may be replaced without the need for further components of the device, for example the induction coil, to be replaced as well. In this way, a replacement of the heating element is more cost effective. Also, different heating elements may be used for facilitating different heating regimes. Fox example, heating elements of different length may be used which lead to the heating of different portions of the substrate in a consumable. Heating elements made from different materials may be employed with different heating characteristics.

In the second position, the second housing portion may be detached from the first housing portion. The detachment of the second housing portion may facilitate easier cleaning of the heating element. In this regard, the detached housing portion may be accessible from all sides for cleaning. The heating element may be removed together with the second housing portion. The heating element may subsequently be removed from the second housing portion for cleaning or replacement. Alternatively, the heating element may be integrally connected with the first housing portion such that the heating element is exposed once the second housing portion has been detached from the first housing portion. Alternatively, the heating element may remain attached to the first housing portion when the second housing portion is detached from the first housing portion. The heating element may be subsequently detachable from the first housing portion.

The heating element may be configured to be an insertable element, which can be inserted into the second housing portion. The heating element may be insertable into the second housing portion when the second housing portion is detached from the first housing portion in the second position. Also, the heating element may be connected to the first housing portion in the second position and inserted into the second housing portion when the two housing portions are attached in the first position.

The heating element may comprise a base section and a heating section. The base section may be made of a thermally insulating material. The base may be made of electrically insulating material. The base section may comprise a support element for mounting the heating element within the second housing portion. The base section may include apertures. The apertures may allow air to be drawn through the base section. The base section may enable that the heating element is insertable into the second housing portion. The second housing portion may have a cylindrical hollow shape such as to form a recess into which a consumable may be inserted. The heating element may be arranged along the longitudinal axis of the second housing portion.

The heating element may have an elongate shape. The heating element may have the same length as the longitudinal extent of the coil. The heating element may have the shape of a pin or blade. The heating element may be solid while the coil may have a helical shape. The heating element may be arranged within the coil when the housing portions are connected together in the first position. The coil may be provided as a helical wound coil with the shape of a helical spring. The coil may comprise contact terminals. The contact terminals may allow an AC current to flow through the coil from the power supply. The AC current supplied to the induction coil is preferably a high frequency AC current. For the purpose of this application, the term "high frequency" is to be understood to denote a frequency ranging from about 1 Megahertz (MHz) to about 30 Megahertz (MHz) (including the range of 1 MHz to 30 MHz), in particular from about 1 Megahertz (MHz) to about 10 MHz (including the range of 1 MHz to 10 MHz), and even more particularly from about 5 Megahertz (MHz) to about 7 Megahertz (MHz) (including the range of 5 MHz to 7 MHz). No direct or electrical connection needs to be established between the coil and the heating element, since the magnetic field generated by the coil penetrates the heating element and thereby creates the eddy currents. The eddy currents are converted into heat energy. The coil as well as the heating element may be made from a conductive material such as metal. The heating element and the coil may have a circular, elliptical or polygonal shaped cross-section. The induction coil may be arranged in a cavity of the second housing portion. The cavity may be made from a non-conductive material such that no eddy currents are generated in the cavity of the second housing portion. The whole housing of the device may be made from a non-conductive material.

The base section of the heating element may be configured to align with an internal rim section of the second housing portion. In this way, the base section may be mounted inside of the second housing portion and the heating element may be properly aligned within the second housing portion.

The base section of the heating element may be fixed between the first and second housing portions when the first and second housing portions are in the first position. The heating element may be sandwiched between the housing portions. The heating element may be protected from damage by the first and second housing portions when the housing portions are in the first position.

At least one air inlet may be provided at the side of the first or second housing portion. Air can be drawn through the air inlet and guided past the heating element.

At least one air inlet may be provided at a recess of the second housing portion in which a consumable is insertable such that air can be drawn through the air inlet next to an inserted consumable and guided past the heating element. The recess may have a diameter such that the consumable may be firmly held in the recess in a force fit. An air inlet may be provided as a groove in the recess.

The induction coil may have a varying pitch. The pitch of the coil denotes the spacial distance between individual windings of the coil. A higher pitch, where the distance between the windings is small, may lead to generation of a magnetic field that is stronger. A lower pitch, where the distance between the windings is larger, may lead to generation of a magnetic field that is weak. Different strength magnetic fields lead to different strength eddy currents in adjacent portions of the heating element, and different temperatures. Therefore, a varying pitch may lead to a temperature gradient in the heating element during operation of the induction heater.

The second housing portion may be configured such that a first end of the second housing portion may be connectable with the first housing portion or that a second end opposite of the first end may be connectable with the first housing portion. In other words, the second housing portion may be configured such that the second housing portion may be attached to the first housing portion in two opposite orientations. The second housing portion may be attached to the first housing portion at either end. If a coil with varying pitch is provided in the second housing portion, the heating gradient created in the heating element during operation of the induction heater may be changed. The heating gradient may depend upon the orientation of the second housing portion. Depending upon the orientation of the second housing portion and the induction coil, the tip of the heating element may be heated to a higher temperature than the base of the heating element or vice versa.

The second housing portion may comprise at least two independent induction coils with different heating characteristics. The independent coils may be provided with separate contact terminals. A first terminal for the first induction coil may be provided at the first end of the second housing portion. A second terminal for the second induction coil may be provided at the second end of the second housing portion. The first housing portion may comprise corresponding contact terminals. In this way, the first induction coil may be connected with the power supply, if the first end of the second housing portion is connected with the first housing portion. The second induction coil may be connected with the power supply, if the second end of the second housing portion is connected with the first housing portion. The terminals for transferring electrical energy from the battery to the induction coils may be configured as electrical contacts. Electrical energy may also be transferred inductively. In case the electrical energy is transferred to the first or second induction coils inductively, the first housing portion may comprise a male projection which may be inserted into corresponding female parts at the first and second ends in the second housing portion. The first housing portion may comprise an excitation coil and the second housing portion may comprise corresponding coils for transferring the electrical energy. The excitation coil may be arranged in the male projection of the first housing portion and a corresponding coil may be arranged surrounding the excitation coil in the second housing portion. Alternatively, the second housing portion may comprise male projections and the first housing portion may comprise a corresponding female part. If only one induction coil is used in the second housing portion, the second housing portion may only comprise a single terminal for the transfer of electrical energy. By reversing the orientation of the second housing portion, the first or second induction coil may thus be used in the induction heater.

The induction coils may have a different pitch or may be made from different materials. The induction coils may thus have different heating characteristics. For example, the first coil may be made from a material which has a lower electrical resistance than the material from which the second induction coil is made. As a consequence, the heating element may be heated to a higher temperature if the first induction coil is used during operation of the induction heater.

The heating element may extend essentially half way through the second housing portion when the first and second housing portions are arranged in the first position. The heating element may be arranged inside a first portion of the induction coil. Thus, the heating element may be heated depending upon the heating characteristics of this portion of the induction coil. For example, if an induction coil with a varying pitch is utilized, attaching the second housing portion with the first end will lead to a portion of the induction coil surrounding the heating element with a first pitch. Attaching the second housing portion with the second end will lead to a portion of the induction coil surrounding the heating element with a second pitch. As a consequence, the heating element is heated to different temperatures depending upon the varying pitch of the induction coil and the orientation of the second housing portion relative to the first housing portion.

If two induction coils are utilized, a heating element extending half way through the second housing portion leads to the first or second induction coil surrounding the heating element depending upon which end of the second housing portion is connected with the first housing portion. In this regard, the first and second induction coils may be arranged in the second housing portion such that the first induction coil may essentially be arranged around a first half of the second housing portion adjacent to the first end. The second induction coil may essentially be arranged around a second half of the second housing portion adjacent to the second end.

The first and second housing portions may be hingedly, preferably pivotably, connected with each other, preferably by a pin, such that the housing portions can be moved from the first to the second position. According to this aspect, the housing portions may be firmly connected with each other. The connection may be designed such that the position of the housing portions may be changeable from the first to the second position and vice versa.

The first housing portion of the device may comprise a controller. The controller may comprise a microprocessor, which may be a programmable microprocessor. The controller may comprise further electronic components. The controller may be configured to regulate a supply of electric power to the induction heater. Electric power may be supplied to the induction heater continuously following activation of the device or may be supplied intermittently, such as on a puff-by-puff basis. The power may be supplied to the induction heater in the form of pulses of electrical current.

The device may comprise a power supply in the first housing portion, typically a battery. As an alternative, the power supply may be another form of charge storage device such as a capacitor. The power supply may require recharging and may have a capacity that allows for the storage of enough energy for one or more puffs; for example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the induction heater.

The consumable may comprise an aerosol-forming substrate. The aerosol-forming substrate may comprise homogenised tobacco material. The aerosol-forming substrate may comprise an aerosol-former. The aerosol-forming substrate preferably comprises homogenised tobacco material, an aerosol-former and water. Providing homogenised tobacco material may improve aerosol generation, the nicotine content and the flavour profile of the aerosol generated during heating of the aerosol-generating article. Specifically, the process of making homogenised tobacco involves grinding tobacco leaf, which more effectively enables the release of nicotine and flavours upon heating.

The induction heater may be triggered by a puff detection system. Alternatively, the induction heater may be triggered by pressing an on-off button, held for the duration of the user's puff.

The puff detection system may be provided as a sensor, which may be configured as an airflow sensor and may measure the airflow rate. The airflow rate is a parameter characterizing the amount of air that is drawn through the airflow path of the aerosol-generating device per time by the user. The initiation of the puff may be detected by the airflow sensor when the airflow exceeds a predetermined threshold. Initiation may also be detected upon a user activating a button.

The sensor may also be configured as a pressure sensor to measure the pressure of the air inside the aerosol-generating device which is drawn through the airflow path of the device by the user during a puff.

An aerosol-generating device as described above and a consumable may be an electrically operated smoking system. Preferably, the aerosol-generating system is portable. The aerosol-generating system may have a size comparable to a conventional cigar or cigarette. The smoking system may have a total length between approximately 30 millimetres and approximately 150 millimetres. The smoking system may have an external diameter between approximately 5 millimetres and approximately 30 millimetres.

The invention also relates to an aerosol generating system comprising an aerosol generating device as described above. The system further comprises an aerosol generating article such as a consumable. The aerosol generating article comprises aerosol-forming substrate and is configured to be inserted into the second housing portion.

FIG. 1 shows a conventional induction heater 10 with an elongate heating element 12 that is arranged within an induction coil 14. The elongate heating element 12 has a tapered tip for facilitating the insertion of a consumable.

Figure 2A:
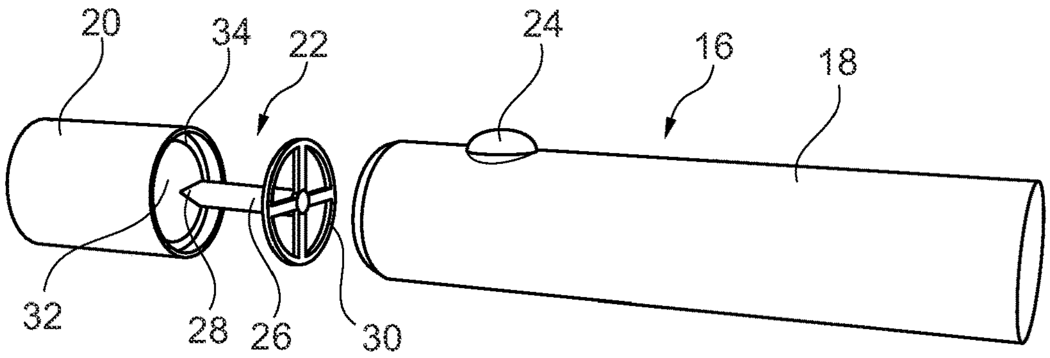
FIGS. 2*a*-2*c* show an embodiment of an aerosol-generating device with detached first and second housing portions.
Figure 2B:
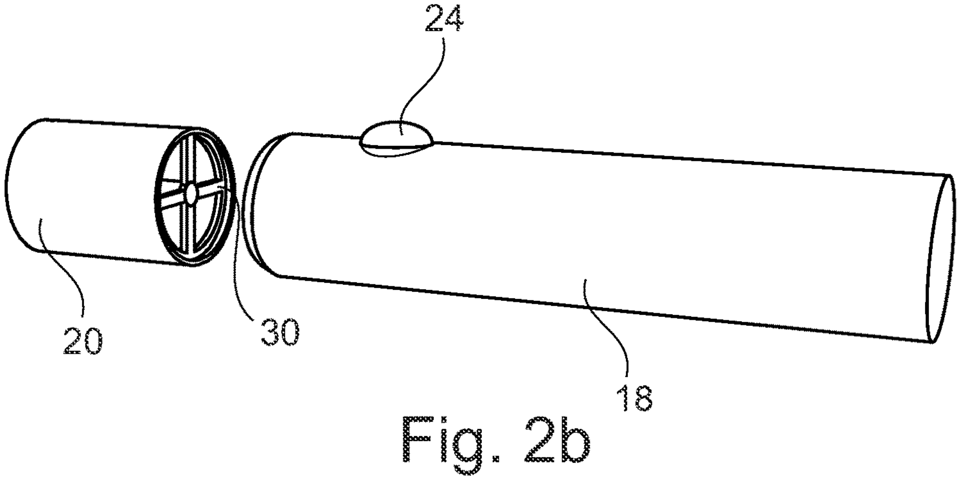
Figure 2C:
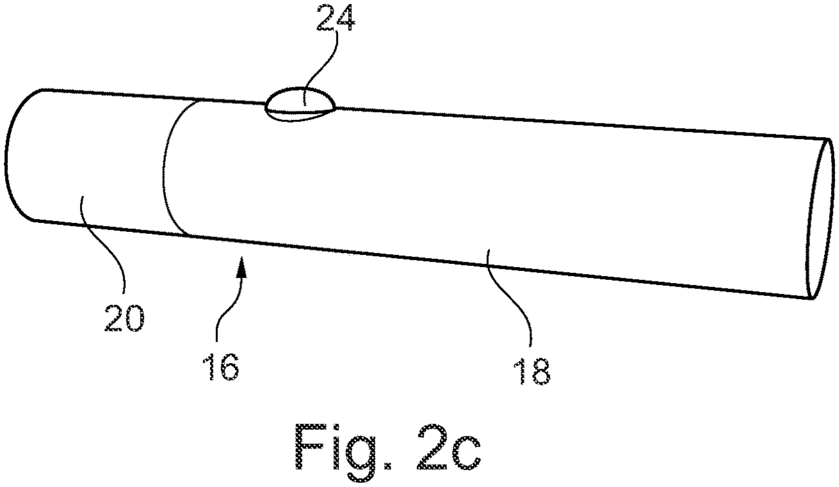

FIGS. 2*a*-2*c* show an aerosol-generating device 16 according to the invention. FIG. 2*a* shows two housing portions, a first housing portion 18 and a second housing portion 20. The first housing portion 18 comprises a battery and a controller for controlling the flow of electrical energy from the battery to an induction heater 22. For activating the induction heater 22, a button 24 is provided. The induction heater 22 is arranged between the first and second housing portions 18, 20. The first and second housing portions 18, 20 and the induction heater 22 are provided as separate elements. The induction heater 22 comprises a heating element 26 with a tapered tip 28 and a base section 30. The induction heater 22 further comprises an induction coil, which is arranged inside of the second housing portion 20 and can thus not be seen in FIGS. 2*a*-2*c*. The heating element 26 of the induction heater 22 is made from an electrically conductive material. The base section 30 is made from a thermally insulating and electrical non-conductive material.

FIG. 2*b* shows the induction heater 22 being inserted into a recess 32 in the second housing portion 20. In the recess 32 of the second housing portion 20, a rim section 34 is provided. The base section 30 of the induction heater 22 has a disc-shape such that the base section 30 abuts the rim section 34 of the second housing portion 20. The base section 30 further has holes or apertures for enabling air to be drawn through the base section 30.

FIG. 2*c* shows the first and second housing portions 18, 20 and the induction heater 22 being connected and arranged in the first position such that the aerosol-generating device 16 is ready to be used. In FIGS. 2*a* and 2*b*, the first and second housing portions 18, 20 are detached from each other in the second position such that the heating element 26 is accessible. In the second position, the heating element 26 can be accessed for cleaning or replacement.

Figure 3A:
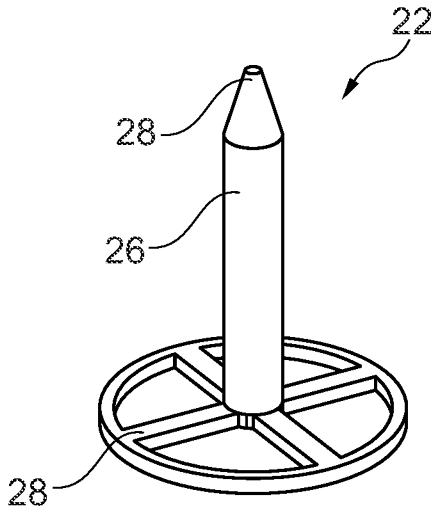
FIGS. 3*a* and 3*b* show an induction heater according to the invention with a base section.
Figure 3B:
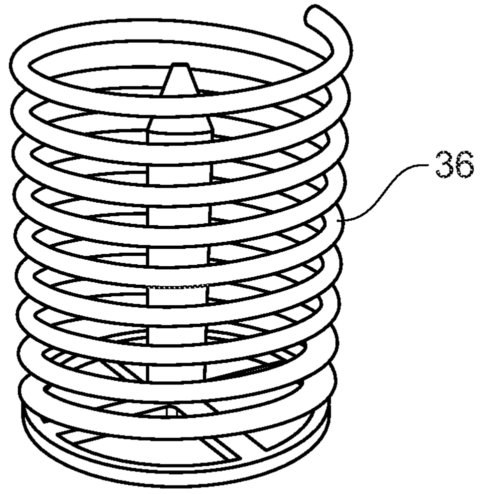

FIG. 3*a* shows the heating element 26 and the base section 30. The heating element 26 comprises a tapered tip 28 such a consumable can be pushed over the heating element 26. In FIG. 3*b*, the induction coil 36 is depicted arranged around the heating element 26. The induction coil 36 is arranged in a cavity in the second housing portion 20 to protect the induction coil 36 from external damaging and contamination.

Figure 4A:
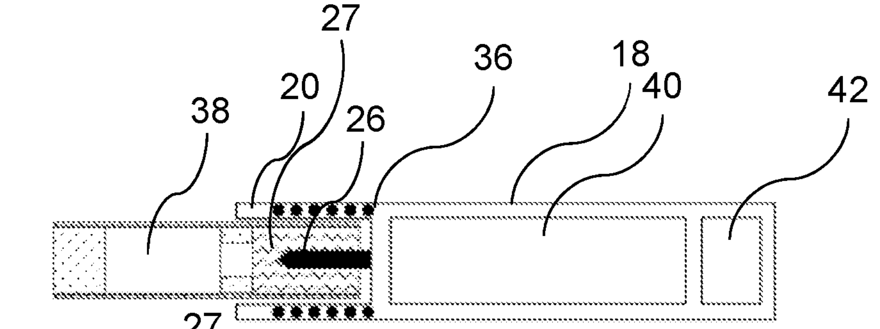
FIGS. 4*a*-4*c* show an illustrative cross-sectional view of the aerosol-generating device with different air inlets.
Figure 4B:
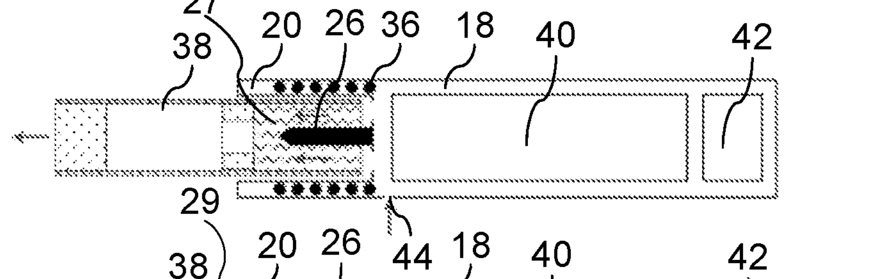
Figure 4C:
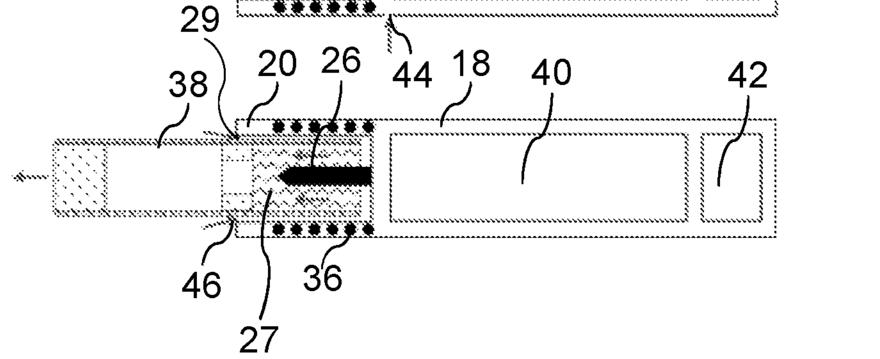

FIGS. 4*a*-4*c* show a cross-sectional view of the aerosol-generating device 16. In FIGS. 4*a*-4*c*, the first housing portion 18, a battery 40, a controller 42, the second housing portion 20, a heating element 26, and an aerosol-forming substrate 27 (part of a consumable 38), are depicted. FIG. 4*a* shows the first and second housing portions 18, 20 and the induction heater 22 being connected and arranged in the first position. FIG. 4*b* shows an air inlet 44 at a side surface of the first housing portion 18 such that ambient air can be drawn through the air inlet 44 by a user drawing on a consumable 38. The air flow is indicated by arrows in FIG. 4*b*, showing that air can be drawn through the air inlet 44 and guided past the heating element 26. FIG. 4*c* shows an embodiment with a different air inlet 46, which is arranged in a space between the consumable 38 and an inner surface 29 of the second housing portion 20. In this embodiment, the air inlet 46 is provided as a groove such that air can be drawn into the device between the consumable 38 and the inner surface 29 while the consumable 38 is securely held in the inner surface 29 of the second housing portion 20. Also in FIG. 4*c*, the airflow is indicated by arrows, showing that air can be drawn through the air inlet 46 and guided past the heating element 26.

Figure 5A:
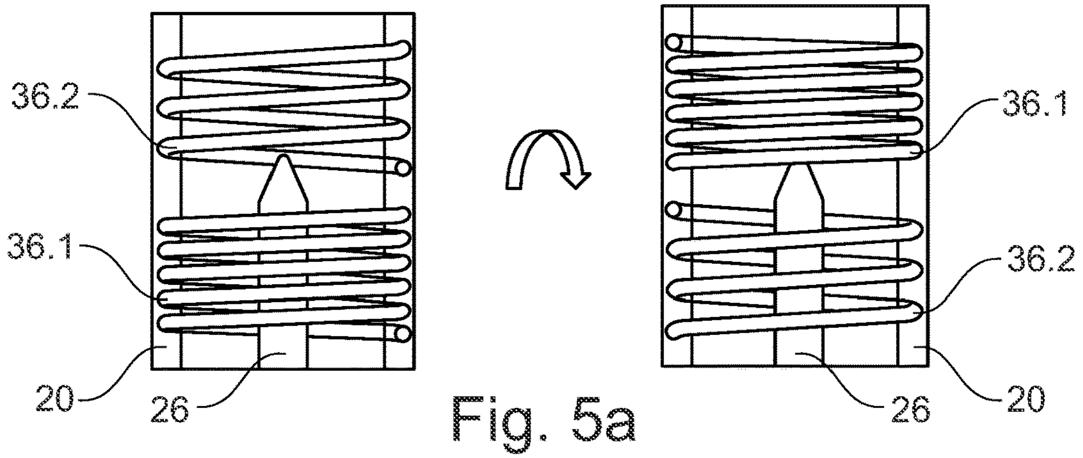
FIGS. 5*a*-5*c* show different embodiments of the induction coil of the induction heater.
Figure 5B:
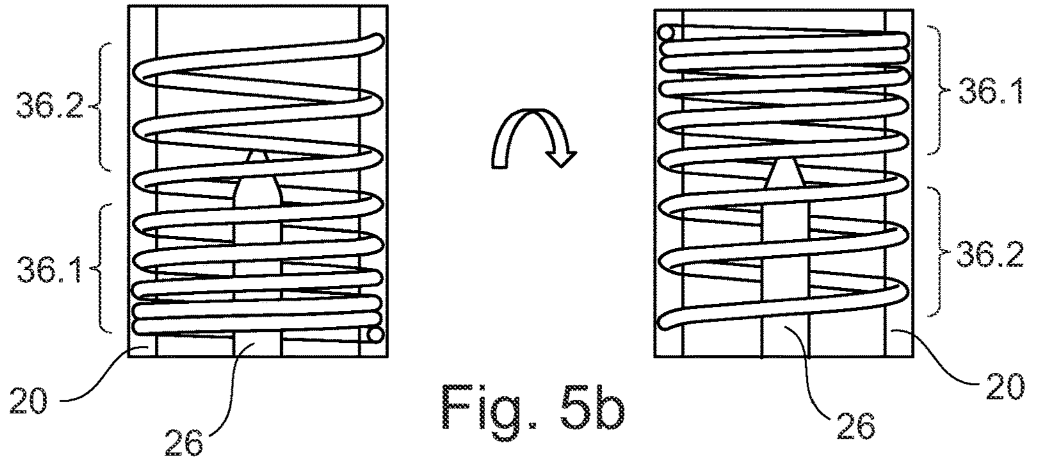
Figure 5C:
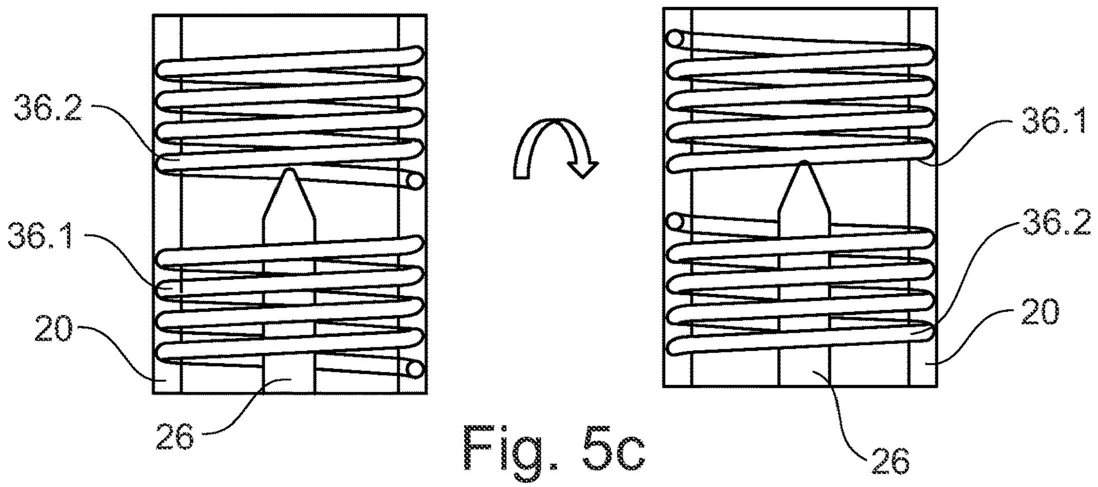

In FIGS. 5*a*-5*c*, different embodiments of induction coils 36.1, 36.2 are depicted. The two induction coils 36.1, 36.2 may replace the single induction coil 36 as described in the context of FIGS. 2*a* to 4*c*. FIG. 5*a* shows the two induction coils 36.1, 36.2 arranged within the second housing portion 20. The two induction coils 36.1, 36.2 may essentially be provided in respective halves of the second housing portion 20. The heating element 26 may have a length such that the heating element 26 is surrounded by one of the induction coils 36.1, 36.2 when inserted into the second housing portion 20. The two induction coils 36.1, 36.2 may have, as depicted in FIG. 5*a*, different pitches. FIG. 5*b* shows a single induction coil with a varying pitch such that two induction zones 36.1, 36.2 are provided. The heating element 26 may have a length such that the heating element 26 can be arranged within one of the induction zones 36.1, 36.2. FIG. 5*c* shows the two induction coils 36.1, 36.2 being made from different materials. In all the embodiments depicted in FIG. 5*a*-5*c*, the magnetic field created by the induction coils 36.1, 36.2 or the induction zones 36.1, 36.2, respectively, varies due to the different characteristics of the coils/zones 36.1, 36.2. This leads to a different heating of the heating element 26 depending upon the coil/zone 36.1, 36.2 surrounding the heating element 26.

Figures 6A, 6B, 6C:
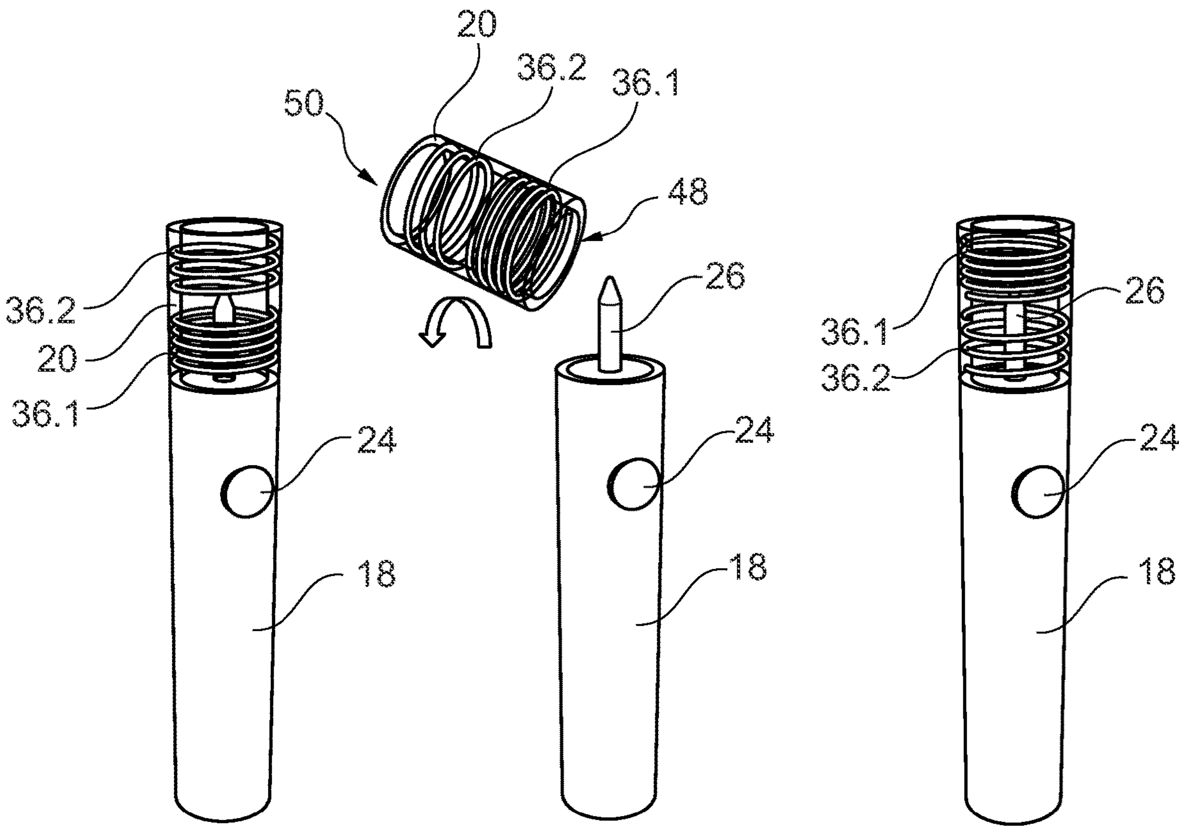
FIGS. 6*a*-6*c* show the aerosol-generating device with a second housing portion with two opposite orientations.

FIGS. 6*a*-6*c* show the second housing portion 20 being configured to be attached with the first housing portion 18 in two opposite orientations. The heating element 26 is depicted integrally connected with the first housing portion 18. However, as described previously, the heating element 26 may also be provided with a base section 30 and as a separate element. In FIG. 6*a*, the second housing portion 20 is connected with the first housing portion 18. In the second housing portion 20, two induction coils 36.1, 36.2 with a varying pitch are arranged. FIG. 6*a* shows the second housing portion 20 connected with the first housing portion 18 such that an induction coil 36.1 with a high pitch is arranged adjacent to a first end 48 of the second housing portion 20. The second housing portion 20 comprises respective contacting terminals at the first end 48 such that the induction coil 36.1, and only the induction coil 36.1, can be connected with the battery 40.

FIG. 6*b* shows the second housing portion 20 being detached from the first housing portion 18. The orientation of the second housing portion 20 is reversed such that a second end 50 of the second housing portion 20 now faces the first housing portion 18. Adjacent to the second end 50 of the second housing portion 20, an induction coil 36.2 with a low pitch is arranged. In FIG. 6*c*, the second end 50 of the second housing portion 20 is connected with the first housing portion 18. The second housing portion 20 comprises respective contacting terminals at the second end 50 for connecting the induction coil 36.2, and only the induction coil 36.2, with the battery 40. Corresponding contacting terminals are provided at the first housing portion 18. The heating element 26 has a length which extends essentially half through the second housing portion 20. In this way, the heating regime can be changed by reversing the orientation of the second housing portion 20. All the embodiments of induction coils 36 depicted in FIGS. 5*a*-5*c* can be employed in FIGS. 6*a*-6*c*.

Figure 7A:
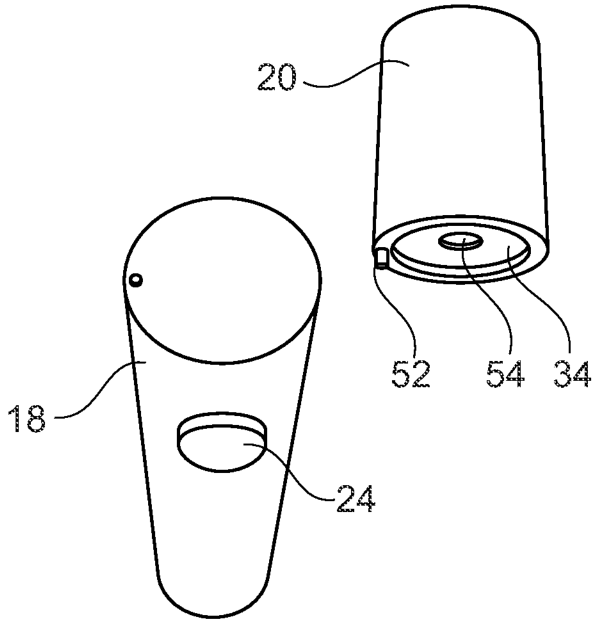
FIGS. 7*a* and 7*b* show a pivotable connection between the first and second housing portions.
Figure 7B:
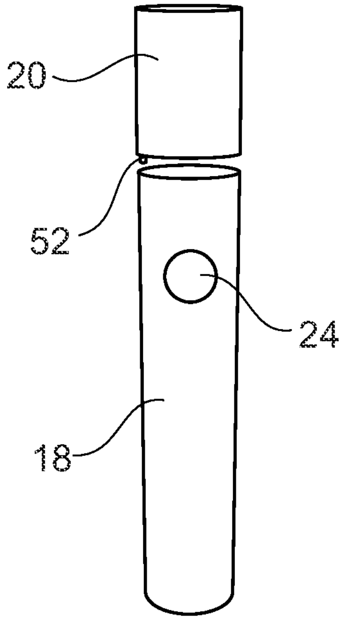

FIGS. 7*a* and 7*b* shows an embodiment in which the first and second housing portions 18, 20 are firmly connected with each other and cannot be fully detached from each other. For accessing the heating element 26, the first and second housing portions 18, 20 can be pivoted from the first position to the second position. A pin 52 is depicted for connecting the first and second housing portions 18, 20 and enabling a pivoting of the first and second housing portions 18, 20 with respect to each other. FIG. 7*a* shows an aperture 54 for inserting the heating element 26 into the recess of the second housing portion 20. As described above, the induction heater 22 may comprise a base section 30 for abutting a rim section 34 provided in the second housing portion 20. In FIG. 7*a*, the rim section 34 is depicted broader than in previous FIG. 2*a*. However, the functionality of the rim section 34 is unchanged.

Figure 8A:
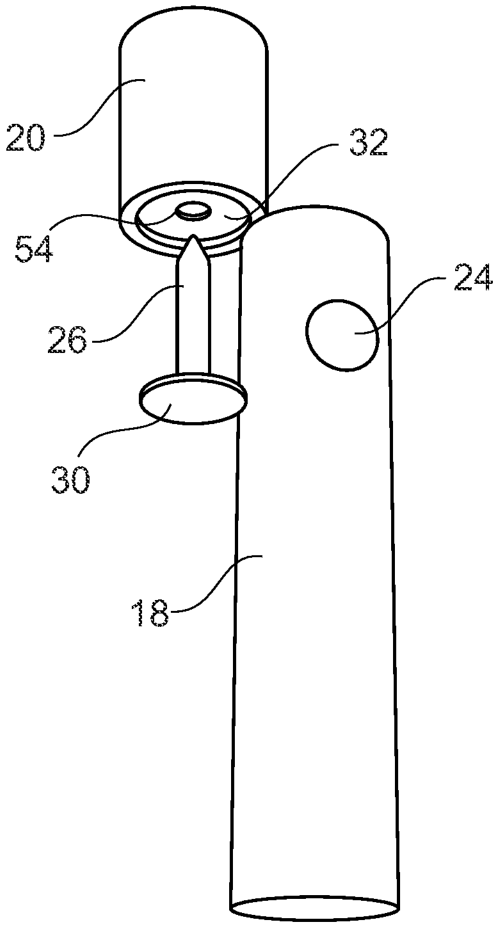
FIGS. 8*a* and 8*b* show a detachable heating element in the aerosol-generating device of FIGS. 7*a* and 7*b*.
Figure 8B:
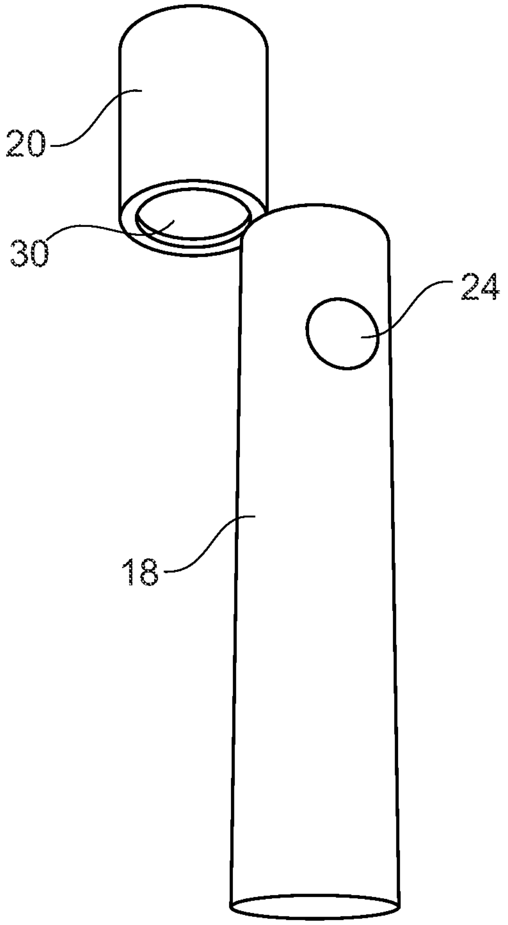

FIGS. 8*a* and 8*b* shows the embodiment depicted in FIGS. 7*a* and 7*b*. The induction heater 22 comprising the heating element 26 and the base section 30 is depicted being insertable into the aperture 54 of the second housing portion 20. In FIG. 8*a*, the heating element 26 has not yet been inserted into the aperture 54 of the second housing portion 20. In FIG. 8*b*, the heating element 26 has been inserted into the aperture 54 of the second housing portion 20. Thereafter, the second housing portion 20 can be pivoted from the second position to the first position and the aerosol-generating device 16 is ready to be operated.

The invention is not limited to the described embodiments. The skilled person understands that the features which are described in the context of the different embodiments can be combined with each other within the scope of the invention.

The invention claimed is:

1. An aerosol-generating device, comprising:

an induction heater configured to heat an aerosol-forming substrate, the induction heater comprising an induction coil and a heating element, wherein the heating element is arrangeable within the induction coil, wherein the induction coil has a varying pitch, wherein the heating element comprises a base section and a heating section, wherein the base section is made of an electrically insulating material, and wherein the induction coil provides two induction zones.

2. The aerosol-generating device according to claim 1, wherein the base section is made of a thermally insulating material.

3. The aerosol-generating device according to claim 1, wherein the base section comprises one or more apertures configured to allow air to be drawn through the base section.

4. The aerosol-generating device according to claim 1, wherein the heating element has an elongate shape.

5. The aerosol-generating device according to claim 1, wherein the heating element has a same length as a longitudinal extent of the induction coil.

6. The aerosol-generating device according to claim 1, wherein the heating element is solid and the induction coil has a helical shape.

7. The aerosol-generating device according to claim 1, wherein the induction coil comprises contact terminals.

8. The aerosol-generating device according to claim 7, wherein the contact terminals are configured to allow an alternating current to flow through the induction coil from a power supply.

9. The aerosol-generating device according to claim 8, wherein the AC current supplied to the induction coil is a high-frequency alternating current.

10. The aerosol-generating device according to claim 1, wherein the induction coil and the heating element are made from a conductive material.

11. The aerosol-generating device according to claim 1, wherein the heating element and the induction coil have a circular-shaped, elliptical-shaped, or polygonal-shaped cross-section.

12. The aerosol-generating device according to claim 1, wherein a whole housing of the device is made from a non-conductive material.

13. The aerosol-generating device according to claim 1, wherein the varying pitch of the induction coil is configured to lead to a temperature gradient in the heating element during operation of the induction heater.

14. The aerosol-generating device according to claim 1, wherein, during operation of the induction heater, a magnetic field is created that varies due to different characteristics of the two induction zones.

15. The aerosol-generating device according to claim 1, wherein the induction coil is a single induction coil.

16. The aerosol-generating device according to claim 1, further comprising a housing comprising a first housing portion and a second housing portion.

17. The aerosol-generating device according to claim 16, wherein the first housing portion comprises a power supply configured to supply power to the induction coil of the induction heater and a controller configured to control a supply of power from the power supply to the induction coil, and wherein the second housing portion comprises the induction coil of the induction heater, and is configured to receive a consumable containing an aerosol-forming substrate.

18. The aerosol-generating device according to claim 17, wherein the first housing portion and the second housing portion are configured to be arranged in a first position and a second position, and wherein the first housing portion and the second housing portion are movable between the first position, in which the induction heater is configured to be operated, and the second position, in which the induction heater is accessible.

19. The aerosol-generating device according to claim 16, wherein the heating element comprises a base section and a heating section, and wherein the base section of the heating element is configured to align with an internal rim section of the second housing portion.

20. The aerosol-generating device according to claim 16, wherein the second housing portion has a cylindrical hollow shape that forms a recess into which a consumable is insertable.

21. The aerosol-generating device according to claim 16, wherein the heating element is arranged along a longitudinal axis of the second housing portion.

22. The aerosol-generating device according to claim 16, wherein the induction coil is arranged in a cavity in the second housing portion.

23. The aerosol-generating device according to claim 1, wherein the induction heater is configured to be triggered by a puff detection system or by pressing an on-off button.

24. The aerosol-generating device according to claim 23, wherein the puff detection system is a sensor.

25. The aerosol-generating device according to claim 24, wherein the sensor is configured as an airflow sensor and is configured to measure an airflow rate.

26. The aerosol-generating device according to claim 24, wherein the sensor is configured as a pressure sensor and is configured to measure a pressure of air inside the aerosol-generating device that is drawn through an airflow path of the aerosol-generating device by a user during a puff.

27. An aerosol generating system, comprising:

an aerosol generating device according to claim 1; and an aerosol generating article comprising an aerosol-forming substrate, wherein the aerosol-generating device further comprises a first housing portion and a second housing portion, and wherein the aerosol-generating article is configured to be inserted into the second housing portion.

28. The aerosol generating system according to claim 27, wherein the aerosol-forming substrate comprises homogenised tobacco material.

* * * * *